United States Patent
Raudat et al.

[15] 3,635,322
[45] Jan. 18, 1972

[54] CONVEYOR SYSTEM FOR DIVIDING A LINE OF ARTICLES INTO SEVERAL DISCRETE LANES

[72] Inventors: John L. Raudat, North Madison; Lloyd D. Johnson, Portland; Anthony L. Cuneo, Chester, all of Conn.

[73] Assignee: Emhart Corporation, Bloomfield, Conn.

[22] Filed: Feb. 24, 1970

[21] Appl. No.: 13,639

[52] U.S. Cl. ........................................198/31 AA, 198/179
[51] Int. Cl. ..........................................................B65g 47/26
[58] Field of Search ......................................198/31 A, 179

[56] References Cited

UNITED STATES PATENTS

| | | | |
|---|---|---|---|
| 842,209 | 1/1907 | Knapp et al. | 198/31 A1 |
| 1,925,502 | 9/1933 | Schaeffer | 198/179 X |
| 2,273,509 | 2/1942 | Braren | 198/31 A1 |
| 2,988,199 | 6/1961 | Pinkham | 198/179 X |
| 3,469,673 | 9/1969 | Gentry | 198/31 A1 |

FOREIGN PATENTS OR APPLICATIONS 687,587  2/1940  Germany ..........................198/31 A1

Primary Examiner—Richard E. Aegerter
Assistant Examiner—H. S. Lane
Attorney—McCormick, Paulding & Huber

[57] ABSTRACT

Noncircular articles are fed in a single line on a primary conveyor, and a pair of take away conveyors are provided on either side thereof for receiving articles diverted from the primary conveyor. A pair of pocket chain conveyors have facing runs traveling downstream at a slightly slower speed than that of the primary and take away conveyors. U-shaped pockets are mounted at staggered locations on these pocket chain conveyors, and move inwardly to releasably grip the articles to be diverted, and once an article has been so gripped these pockets move outwardly to divert the article onto an associated take away conveyor. An article-stripping bar acts on the article so diverted, releasing it from the U-shaped pocket, which pocket then travels upstream for diverting another article. With two take away conveyors, every third article is allowed to pass between the pocket chain conveyors and three discrete lanes of articles are provided.

7 Claims, 4 Drawing Figures

INVENTORS
JOHN L. RAUDAT
LLOYD D. JOHNSON
ANTHONY L. CUNEO
BY McCormick, Paulding & Huber
ATTORNEYS INVENTORS
JOHN L. RAUDAT
LLOYD D. JOHNSON
ANTHONY L. CUNEO
BY McCormick, Paulding & Huber
ATTORNEYS

CONVEYOR SYSTEM FOR DIVIDING A LINE OF ARTICLES INTO SEVERAL DISCRETE LANES

BACKGROUND OF THE INVENTION

Various prior art devices have been devised for dividing a single line of articles into two or more discrete lanes U.S. Pat. No. 2,273,509 issued to Braren Feb. 17, 1942 shows one construction wherein a pair of star wheels are driven in opposite directions to divert one circular article in one lateral direction, and a succeeding article in the opposite direction to associated take away conveyors downstream of, or along side a primary conveyor. The star wheel configuration has been found to be entirely satisfactory for articles of circular configuration, but unsuitable for diverting noncircular articles.

U.S. Pat. No. 2,923,395 issued to Von Hofe Feb. 2, 1960 shows a pair of lead screws driven in opposite directions on either side of a primary conveyor, for diverting noncircular articles laterally outwardly into discrete lanes. While this apparatus is specifically designed for noncircular articles, it has several disadvantages as compared to the star wheel construction for diverting circular articles. For example, the screw construction is much more expensive to fabricate, every articles size requiring its own left- and right-hand screws.

The purpose of the present invention is to provide an apparatus for dividing articles into several discrete lanes from a continuous single line, especially for diverting articles having a noncircular configuration.

SUMMARY OF THE INVENTION

In accordance with the present invention a primary conveyor is provided with lane defining means for directing a line of articles single file into an article-diverting area defined by a pair of horizontally opposed pocket chain conveyors one of which is associated with each of two take away conveyors. The take away conveyors are located one on either side of the primary conveyor to provide three discrete lanes for the diverted articles. The pocket chain conveyors define a converging space therebetween wherein U-shaped article-receiving pockets move inwardly to resiliently grasp an article to be diverted between their associated leg portions. A diverging space is defined further downstream between the pocket chain conveyors with a throat area therebetween. The articles are diverted laterally outwardly off the primary conveyor onto the associated take away conveyors in the diverging space, and an article stripping bar is provided for urging each article out of its U-shaped pocket onto one of the take away conveyors. For each two articles diverted onto the two take away conveyors a third article is allowed to pass through the throat on the primary conveyor.

DETAILED DESCRIPTION OF THE PREFERRED EMBODIMENT

Figure 1:
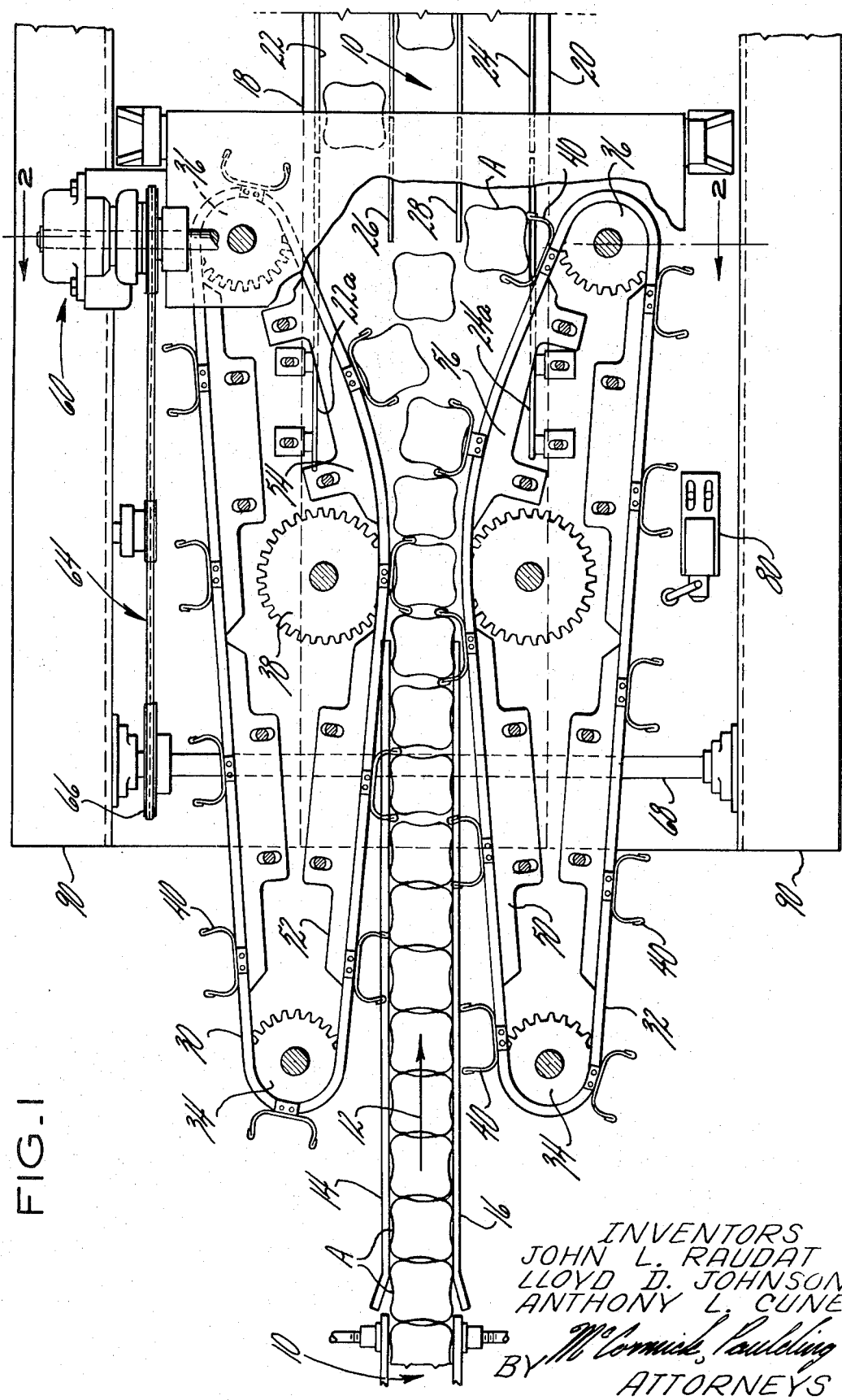
FIG. 1 is a plan view of an apparatus embodying the present invention, with an upper support plate broken away to reveal the two pocket chain conveyors.
Figure 3:
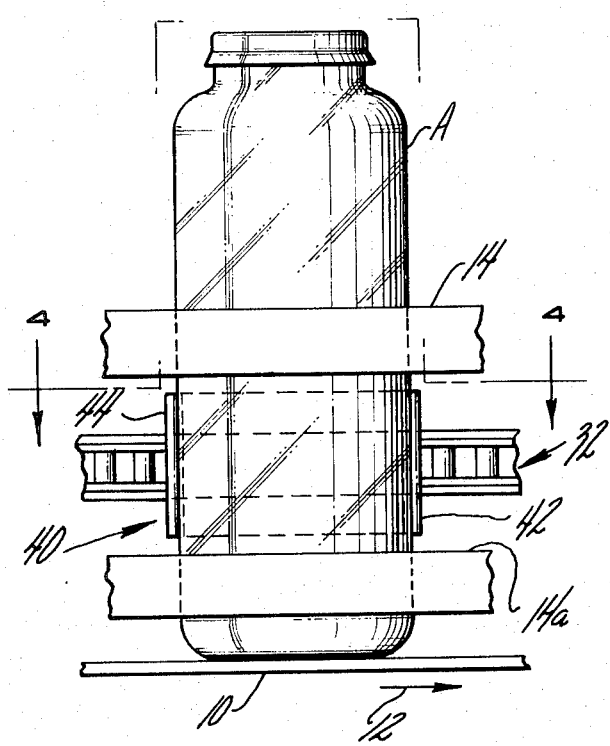
FIG. 3 is an elevational view showing one of the noncircular articles releasably held in one of the U-shaped pockets carried by the pocket chain conveyor.

Turning now to the drawings in greater detail, FIG. 1 shows a conventional endless primary conveyor 10 which is continuously driven in a longitudinal direction as indicated by the arrow 12 from left to right so as to feed a single line of articles A, A in a downstream direction between vertically spaced lane-defining guide bars 14, 14a and 16, 16a. As shown in FIG. 3 these lane-defining guide bars, 14 and 14a are located in vertically spaced relationship with respect to the pocket chain conveyor indicated generally at 32 for a purpose to be discussed in greater detail hereinbelow.

A pair of take away conveyors 18 and 20 are arranged on opposite sides of the primary conveyor 10 and each of these also has associated lane-defining means, indicated generally at 22 and 24 with respect to the outside limit of the lane defined on each of said take away conveyors, and as indicated generally at 26 and 28 with respect to the inside limit of these lanes. The upstream ends of these take away conveyors are rotatably supported on a pair of drums (not shown) mounted on the shaft 68 to be described.

Two pocket chain conveyors 30 and 32 are associated with each of the take away conveyors 18 and 20 respectively, and it will be apparent from FIG. 1 that each of these is symmetrically arranged with respect to the longitudinal center line defined by the primary conveyor 10. For example, the pocket chain conveyor 30 associated with take away conveyor 18 is of the same length as the pocket chain conveyor 32 associated with the take away conveyor 20 and both travel in horizontal paths which are similar to one another though opposite in direction. These pocket chain conveyors comprise conventional chains entrained over three sprockets 34, 36 and 38 associated with each conveyor, and more particularly, their inner or downstream runs define a converging space between the sprockets 34, 34 and the somewhat larger sprockets 38, 38. The two pocket chain conveyors 30 and 32, in the area of the larger sprockets 38, 38 cooperate to define a throat opening and between said sprockets 38, 38 and the downstream sprockets 36, 36 define a diverging space wherein the inner or downstream run of each of said pocket chain conveyor moves obliquely across its associated take away conveyor.

Each pocket chain conveyor has provided thereon a plurality of U-shaped pockets mounted at spaced locations, which locations are staggered on the one conveyor 30 with respect to the other 32 so that for every article A allowed to proceed downstream on the primary conveyor 10, one article is diverted from the primary conveyor onto one take away conveyor 18, and also one article is diverted onto the other take away conveyor 20. Thus, it will be apparent that each of the pocket chain conveyors moves in a closed horizontal path and in timed but staggered relationship to the pockets of its counterpart so that for every article diverted onto the first of the above-mentioned take away conveyors 18 a subsequent article is diverted onto the second take away conveyor 20 in the diverging space defined between the downstream segments of the pocket chain conveyors defined between the throat associated sprockets 38 and 38, the downstream sprockets 36 and 36.

Figure 4:
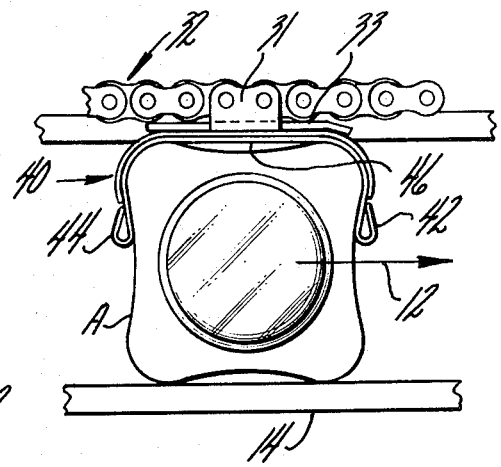
FIG. 4 is a plan view of the article shown in FIG. 3, with the U-shaped pocket releasably holding said article for movement in the direction of the arrow.

Turning now to a more detailed description of the configuration of each of the pockets on the pocket chain conveyors 30 and 32, FIG. 3 shows the fixed lane-defining guide bars 14 and 14a on one side of a noncircular article A of the type adapted to be handled by the present device, and on the rear side of said article A there is shown a pocket chain conveyor 30 having a generally U-shaped resilient pocket 40 carried thereby, and with forwardly protruding leg portions adapted to at least partially encircle the article to releasably hold it. As the primary conveyor 10 moves in the direction of the arrow 12, as indicated in FIGS. 3 and 4, the leading or front leg portion 42 of the U-shaped pocket can be seen to engage the front face of the generally square bottle shown, and the rear or trailing leg portion 44 of the U-shaped pocket can be seen to be in engagement with the rear face of the article A. As best shown in FIG. 4, the U-shaped pocket is connected to one link 31 of the chain 30, and said link 31 is provided with a shoelike member 33 which serves to maintain the U-shaped pocket 40 in the orientation shown with respect to the chain 30 as the latter passes around one of the above-mentioned sprockets 34, 36 and 38. The U-shaped pocket 40 more particularly includes a base portion 46 which is secured to this shoelike portion 33 and is preferably fabricated from spring steel or similar material. As so constructed the leg portions 42 and 44 have sufficient resiliency whereby they can releasably grip the article A, especially where said article is generally square with concave sides as in the configuration shown.

It will be apparent from FIG. 1 that as these U-shaped pockets 40 move laterally inwardly toward the primary conveyor, and between the vertically spaced guide rails forming the lane-defining means 14 and 16 on the primary conveyor, these leg portions will be entered into the spaces provided between adjacent articles A, A on the primary conveyor 10. These leg portions 42 and 44 will be spread slightly as a result of this inward motion so that the end portions of said leg portions are received in the concavely shaped front and rear faces of the articles A, A. The fixed vertically spaced guide rails 14, 14a and 16, 16a provide a convenient reactive surface against which the pockets can act to permit said leg portions to be so inserted between the articles, and to so grip the articles.

As will be apparent from FIG. 1 these pockets are mounted to their associated pocket chain conveyors in staggered relationship so that one article proceeds downstream on the primary conveyor 10 and a succeeding article is diverted in one lateral direction onto the first take away conveyor 18, whereas the third article is diverted in the opposite lateral direction onto the second take away conveyor 20. This cycle repeats itself continuously during operation of the subject device. In order to strip or release an article A from its associated U-shaped pocket, the take away conveyors 18 and 20 have associated therewith upstream segments 22a and 24a of their outer lane-defining walls, 22 and 24 respectively, which segments also comprise vertically spaced rails passing one above and one below the path of the pocket chain conveyor and its associated U-shaped pocket. For example, the adjustably mounted guide rail section 24a associated with the outer limit lane-defining means 24 can be seen to be in the process of stripping an article A from its associated pocket 40 so that the article is free to travel with the second take away conveyor 20 in the manner just described. A similar segment 22a associated with the outer limit of the lane-defining means 22 associated with the first take away conveyor 18 serves a similar function to be carried out at a slightly later instant of time during the cycle.

It will also be apparent from FIG. 1 that the space provided between the downstream pocket chain conveyor segments passing between the sprockets 36 and the throat-defining sprockets 38 comprises an area where the articles A are free to be diverted from the primary conveyor 10 to one or the other of the two take away conveyors 18 and 20. More particularly, the upstream ends of the inner limits of the paths of movement of the diverted articles associated with the take away conveyors 18 and 20 can be seen to terminate adjacent the downstream end of this divergent space. The actual location, in the longitudinal direction, for the termination of these lane defining members 26 and 28 can be seen to be located slightly downstream of the intersection between the path of movement of the pocket chain conveyors 30 and 32 and their associated article stripping or releasing members 22a and 24a. This configuration provides adequate clearance for the slight turning movement required of the noncircular articles as they are being diverted from the primary conveyor 10 onto an associated take away conveyor 18 or 20.

The downstream runs of the pocket chain conveyors 30 and 32 defining the convergent and divergent space upstream and downstream, respectively, of the throat associated sprockets 38, 38 are preferably confined by suitable chain associated track means 50, 52, 54 and 56 in order to properly guide and restrain the chain during its travel between the associated sprockets. For example, the track means 50 provided between the upstream sprocket 34 and throat associated sprocket 38 confines the pocket chain conveyor 32 to move in a linear fashion from a point tangent to the upstream sprocket 34 to a point where it is tangent to the throat associated sprocket 38. The same is true of the track means 52 and associated with the first mentioned pocket chain conveyor 30.

In the confining of the pocket chain conveyors 30 and 32 in the divergent space downstream of the throat, arcuately shaped members of convex external contour are provided between the throat associated sprockets 38, 38 and the downstream sprockets 36, 36. Actually, the throat is defined between upstream end portions of these members 54 and 56, and it will be apparent from FIG. 1 that these convex shapes are adapted to gradually accelerate the articles A, A in the lateral direction as they are being diverted onto the take away conveyors 18 and 20 so as to preclude inadvertent release of an article A from its associated pocket 40 during this diverging operation. This particular shape for the pocket-chain-confining means associated with the diverging space has been found particularly advantageous when the apparatus is operated at high speed, or at any time when the articles A, A exert significant inertial force upon their associated pockets, such as in handling relatively large glass articles such as quart or half-gallon size milk bottles.

Figure 2:
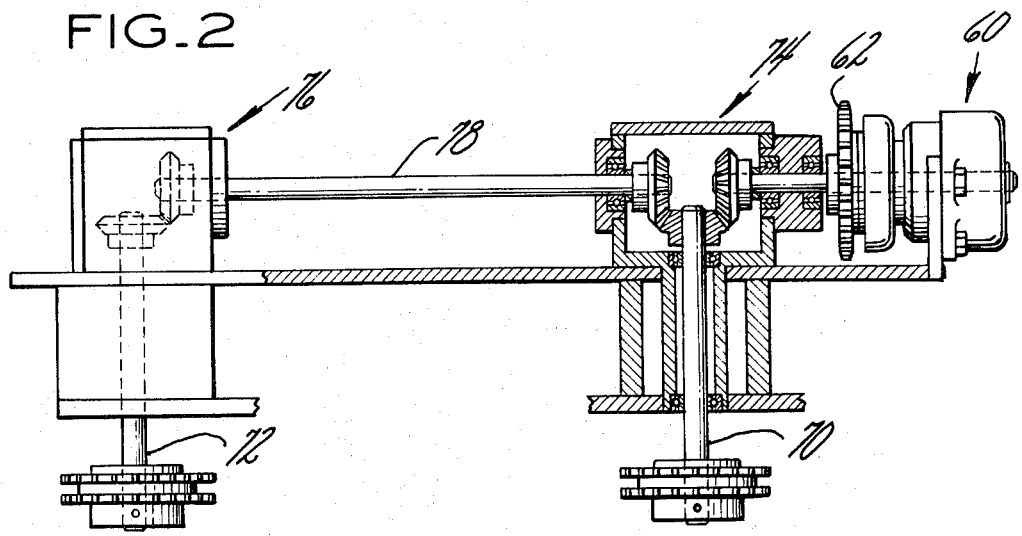
FIG. 2 is a vertical sectional view taken on the line 2—2 of FIG. 1, showing the drive means for the two pocket chain conveyors.

FIG. 2 shows the apparatus, omitted from FIG. 1 for the purposes of clarity, which apparatus is adapted to drive the pocket chain conveyors 30 and 32 in timed relationship with one another. Means, indicated generally at 60, is provided to one side of the first-mentioned pocket chain conveyor, and has associated therewith an output shaft on which is provided a sprocket 62 for operating the take away conveyors 18 and 20 through drive means indicated generally at 64 in FIG. 1. The drive means 64 is entrained over a sprocket 66 which is rotated by the cross shaft 68 forming a part of, and continually driven by the first and the second take away conveyors 18 and 20. Still with reference to FIG. 2, the output shaft of the means 60 is adapted to operate both pocket chain conveyors through depending shafts 70 and 72, which shafts carry sprocket means for driving these pocket chain conveyors (not shown in this view). These depending shafts 70 and 72 are driven through suitable gearing indicated generally at 74 and 76, a second cross shaft 78 being provided therebetween as shown. As so constructed and arranged it will be apparent that the pocket chain conveyors are adapted to be driven in timed relationship with one another, and with their associated take away conveyors 18 and 20. The speed of operation of the primary conveyor 10 need only be sufficient to provide the apparatus with a supply of articles to be diverted. As mentioned above the pocket chain conveyors are driven at a speed slightly faster than that of the take away conveyors.

A limit switch 80 is provided in the position shown, so that when the machine or apparatus described herein is to be shut down for any reason, the articles A, A located in the diverging space will proceed downstream in their associated conveyors, but articles provided in the throat area between the pocket chain conveyors will be held in an upright position and will not tend to topple. More particularly, the limit switch 80 is provided in an electrical series circuit with a conventional on-off switch for operation of the drive means for the take away conveyors (not shown). High- and low-limit switches are also provided (not shown) adjacent the upstream portion of the primary conveyor 10 and slightly downstream of the diverging space respectively for conventional operation and control of the apparatus described herein.

To summarize briefly the operation of the apparatus disclosed herein, a primary or infeed conveyor 10 is provided for bringing a continuous line of articles A, A to be diverted into discrete lanes. A pair of take away conveyors are arranged on opposite sides of the primary conveyor, and pocket chain conveyors associated with said take away conveyors are adapted to divert one article into each of said take away conveyors for each article conveyed downstream on the primary conveyor. The pocket chain conveyors each include a plurality of pockets 40, 40 mounted in staggered relationship to the pocket chain conveyors for engaging these articles to divert them in a diverging space provided for this purpose. The pockets are generally U-shaped and move in a closed horizontal path in timed relationship to the articles being fed by the primary conveyor, and the path of movement of each includes a downstream run wherein the pocket first moves inwardly so that its leg portions are inserted between adjacent articles to releasably retain an article in each of the pockets. The pockets then move laterally outwardly across an associated one of the take away conveyors to divert that particular article off the primary conveyor and onto the take away conveyor. Article-stripping means in the form of guide bars are provided above and below the pocket chain conveyor in the area of the take away conveyors for releasing the article so that it can travel downstream on its associated take away conveyor.

We claim:

1. The combination comprising a primary conveyor upon which a continuous line of articles are continuously fed in a downstream direction, at least one take away conveyor alongside said primary conveyor, a pocket chain conveyor having a plurality of U-shaped pockets at spaced locations thereon, each pocket including resiliently mounted front and rear legs for engaging the front and rear sides respectively of one of said articles to releasably hold the article in said pocket, said pocket chain conveyor causing its associated pockets to move in a closed horizontal path and in timed relationship to the primary conveyor, which path includes a downstream run wherein said pockets first move inwardly so that said legs are inserted between articles in the continuous line to releasably hold one article and then move outwardly obliquely away from said primary conveyor across said take away conveyor to divert that particular article off said primary conveyor and onto said take away conveyor and said U-shaped pockets being spaced from one another on said pocket chain conveyor to provide blank spaces therebetween for allowing an article to continue on said primary conveyor for every article so diverted.

2. The combination recited in claim 1 further characterized by a second take away conveyor on the opposite side of said primary conveyor, a second pocket chain conveyor associated with said second take away conveyor and having a plurality of said resiliently constructed pockets at spaced locations thereon, said second pocket chain conveyor being symmetrically arranged with respect to said first pocket chain conveyor to define a converging space therebetween leading to a throat opening and a diverging space downstream of the throat, said pockets on said second pocket chain conveyor moving in a closed horizontal path and in timed but staggered relationship to the pockets of said first-mentioned pocket chain conveyor so that for every article diverted onto said first mentioned take away conveyor a subsequent article is diverted onto said second take away conveyor in said diverging space and said U-shaped pockets on each of said take away conveyors, being spaced from one another on said respective conveyors to provide blank spaces therebetween for allowing every third article on said primary conveyor to continue in a straight line.

3. The combination recited in claim 2 further characterized by lane-defining guide means for said primary conveyor to restrain the line of articles to movement in a continuous line through said converging space between said pocket chain conveyors and to provide a reactive surface against which said pockets can act to permit said legs to be so inserted and said articles to be releasably held therebetween.

4. The combination recited in claim 3 further characterized by lane defining guide means for said take away conveyors and including at least one guide rail defining the outside limit of the path of movement of those articles diverted onto each of said take away conveyors, each of said guide rails including an upstream segment which extends across the path of movement of an associated pocket chain conveyor in said diverging space for releasing the diverted articles from said pockets against the restraining force exerted by the legs of said pockets.

5. The combination recited in claim 4 wherein said lane defining guide means for said take away conveyors further include guides defining the inner limit of the path of movement of said diverted articles, said inner limit guides having their upstream ends terminating slightly downstream of that location in said diverging space defined by the crossing of said pocket chain conveyors and said article releasing guide rails to provide adequate clearance for any turning movement required of said articles especially when said articles are not of axially symmetrical shape.

6. The combination recited in claim 4 further characterized by a set of at least three sprockets associated with each of said pocket chain conveyors, one sprocket in each set located adjacent the throat, and the other two sprockets in each set located at the upstream end of the convergent space and the downstream end of the divergent space respectively and track means for slidably supporting said pocket chain conveyors as they run between the sprockets defining said divergent space.

7. The combination recited in claim 6 wherein said track means for slidably supporting said pocket chain conveyor runs defining said divergent space comprising arcuately shaped members having a convex contour which permit the articles being diverted to be accelerated gradually in the outward lateral direction associated with the particular pockets on said pocket chain conveyors.

* * * * *